United States Patent [19]

Yamada

[11] Patent Number: 5,287,509
[45] Date of Patent: Feb. 15, 1994

[54] MULTITASKING SYSTEM FOR IN-PROCEDURE LOOPS

[75] Inventor: Shouichirou Yamada, Tokyo, Japan

[73] Assignee: NEC Corporation, Tokyo, Japan

[21] Appl. No.: 66,927

[22] Filed: May 26, 1993

Related U.S. Application Data

[63] Continuation of Ser. No. 605,459, Oct. 30, 1990, abandoned.

[30] Foreign Application Priority Data

Nov. 7, 1989 [JP] Japan .................. 1-289337

[51] Int. Cl.⁵ .................. G06F 15/16; G06F 9/38
[52] U.S. Cl. .................. 395/650; 364/DIG. 1; 364/281; 364/281.6; 364/281.7; 364/281.8
[58] Field of Search ............. 395/650; 364/281, 281.6, 364/281.7, 281.8

[56] References Cited

U.S. PATENT DOCUMENTS

| | | | |
|---|---|---|---|
| 4,839,798 | 6/1989 | Eguchi et al. | 364/200 |
| 5,031,089 | 7/1991 | Liu et al. | 364/200 |
| 5,053,950 | 10/1991 | Naganuma et al. | 364/200 |

*Primary Examiner*—Gareth D. Shaw
*Assistant Examiner*—A. Katbab
*Attorney, Agent, or Firm*—Foley & Lardner

[57] ABSTRACT

A system for multitasking inner loops, such as DO loops, using multiprocessors, provided with a plurality of shared registers each corresponding to one of a plurality of individual processors comprising the multiprocessor system. The plurality of shared registers store start and end values of segments resulting from dividing ranges of loop variables corresponding to the inner loops. The system for multitasking inner loops comprises an executing unit for iteratively executing the processing of the inner loops until the end value is reached. The system also comprises a decision unit for deciding whether or not there remain any unprocessed loops. Finally, the system comprises a continuing unit, responsive to the decision unit for continuing processing of the unprocessed loop or loops by transferring a part of a range which the loop variables corresponding to the unprocessed loop or loops can have.

10 Claims, 4 Drawing Sheets

MULTITASKING SYSTEM FOR IN-PROCEDURE LOOPS

This application is a continuation of U.S. patent application Ser. No. 07/605,459, filed Oct. 30, 1990, now abandoned.

BACKGROUND OF THE INVENTION

The present invention relates to a multitasking system for inner loops, such as a DO loop, in a multiprocessor system for use in information processing.

Multitasking of inner loops, such as the DO loop, in a program is now achieved in a multiprocessor system provided with a main storage accessible from a plurality of processors and from each of the processors. This multitasking results in the simultaneous presence and processing of a plurality of tasks, which are the smallest manageable units in an operating system (OS). Thus, the simultaneous processing would take place among tasks into which a job is divided. This makes it necessary for the OS to have a function which controls data sharing and the synchronism of events among tasks. Usually, a common routine and disk files are used in multitasking.

This multitasking enables a plurality of tasks to be executed in parallel on a plurality of processors to increase the execution speed of inner loops.

In this multitasking of inner loops, the start and end values of loop variables pertaining to loops are set in a single register shared by more than one processor to initiate each task. Each of the initiated tasks compares the start and end values by referring to the start and end values in the shared register while excluding simultaneous reference to the shared register with any other task and its updating. Each task, is this comparison shows that the start value is not greater than the end value, increases the start value in the shared register by an increment corresponding to a single loop, and at the same time executes the loop at that start value. By this method, each processor refers to a single register shared by the processors every time each processor executes a task. As a result, there is the possibility that contention for reference to the shared register occurs as many times as the loop is executed, and this contention increases the time taken to execute the procedure.

By another method, the frequency of contention for reference to the shared register may be reduced by having the programmer designate the number of loops to be executed by a task at a time. This method requires trial and error to find the appropriate value. It further is unable to cope with the unevenness of execution times in iterating a loop, resulting in a corresponding increase in the time taken to execute the procedure.

An object of the present information, therefore, is to provide a multitasking system for inner loops so designed as to reduce the possible occurrence of contention for reference to the register shared by more than one processor and thereby to increase the execution speed by multitasking the inner loops.

SUMMARY OF THE INVENTION

According to one aspect of the invention, there is provided a system for multitasking inner loops and having each task executed by one of individual processors constituting a multi-processor system, provided with shared register means each corresponding to one of the individual processors and storing the start and end values of each of the segments into which the range that can be taken by loop variables pertaining to said inner loops is divided, wherein
each of the tasks on the individual processors involves:
executing means for iteratively executing the processing of the inner loops until the number of times indicated by the end value stored in said shared registers corresponding to the individual processors is reached;
decision means for referring, after the completion of the execution of the processing of the inner loops by the executing means until the number of times represented by the end value is reached, to a shared register corresponding to another processor to decide whether or not there remains any unprocessed loop; and
continuing means responsive to a decision by the decision means that there is an unprocessed loop or loops for continuing the loop processing by transferring to the shared register corresponding to its own processor a part of the range which the loop variables pertaining to the unprocessed loop or loops can take.

BRIEF DESCRIPTION OF THE DRAWINGS

Other features and advantages of the present invention may become more apparent from the following detailed description when taken in conjunction with the accompanying drawings, in which.

In the figures, the same reference codes denote respectively the same constitutent elements.

DESCRIPTION OF THE PREFERRED EMBODIMENTS

Figure 1:
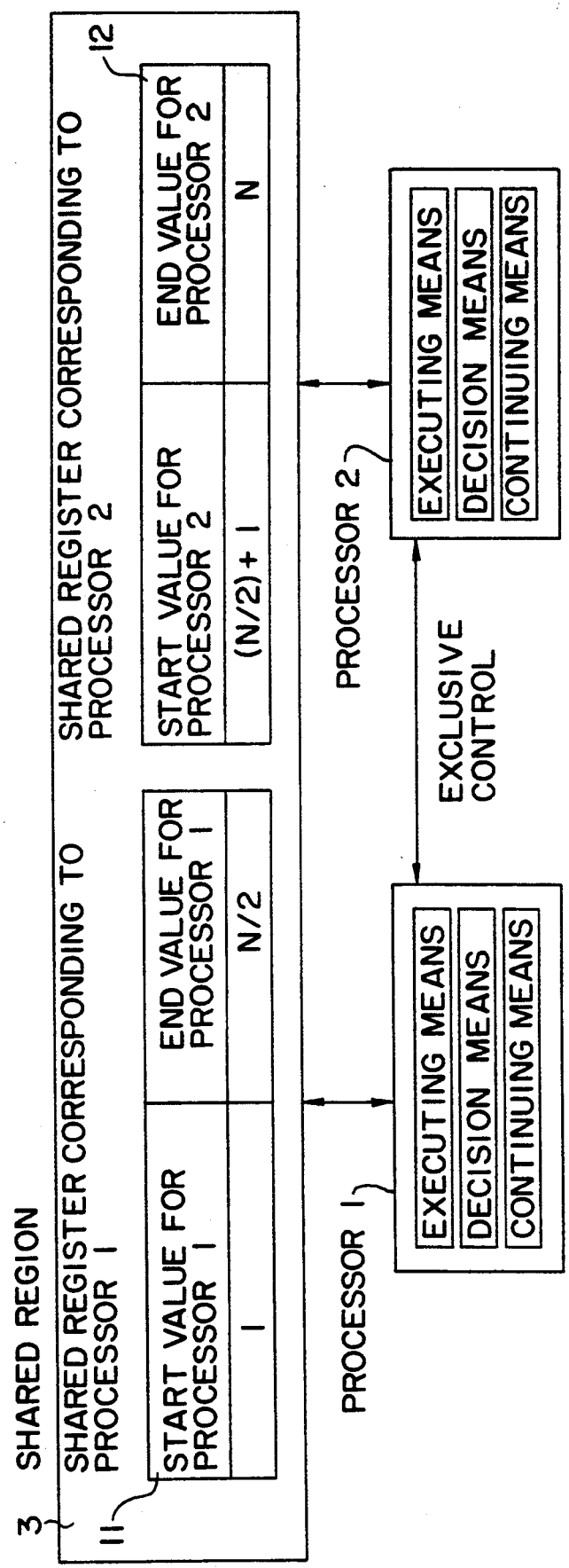
FIG. 1 illustrates a system to which one preferred embodiment of the invention is applied.

Referring to FIG. 1, a system to which one preferred embodiment of the present invention is applied comprises a plurality of processors 1 and 2 for executing individual tasks, and a shared region 3 in a memory unit shared by these processors 1 and 2. In this shared region 3 are a plurality of shared registers 11 and 12 exclusively used under exclusive control between the processors 1 and 2. One shared register 11 corresponds to the processor 1, and the other shared register 12, to the processor 2. In these shared registers 11 and 12 are set the initial start and end values of individual divided segments 1 to N/2 and (N/2)+1 to N, into which the range 1 to N that can be taken by the loop variables pertaining to the inner loops to be multitasked is bisected.

Now will be described in detail the preferred embodiment of the invention, together with the system illustrated in FIG. 1, with reference to the drawing.

Figure 2:
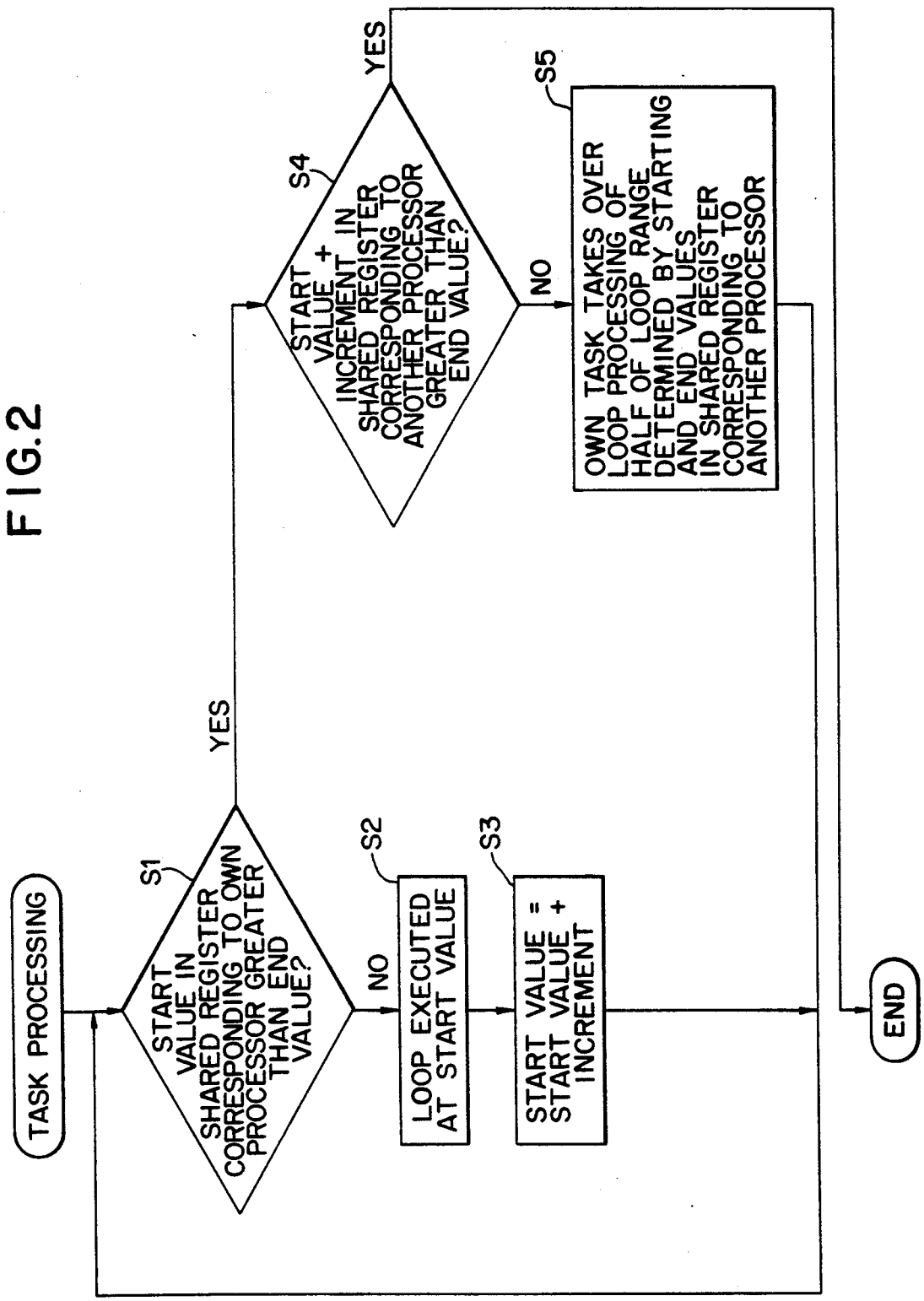
FIG. 2, illustrates characteristic parts of the preferred embodiment of the invention.

Referring to FIGS. 1 and 2, a master task to process the inner loops to be multitasked, sets into the registers 11 and 12, as shown in FIG. 1, the initial start and end values of individual divided segments into which, the range (1 to N) which can be taken by the loop variables pertaining to each inner loop to be multitasked, 2 is divided, where 2, is the number of multitasks. At the same time, the master task initiates slave tasks, shown in FIG. 2, in the processors 1 and 2.

The task initiated on the processor 1 executes its processing shown in FIG. 2 while updating its content in reference to the shared register 11 corresponding to the processor 1. The task initiated on the processor 2 executes its processing shown in FIG. 2 while updating its content with reference to the shared register corresponding to the processor 2.

At the time of initiating each individual slave task, the start value in the shared register 11 corresponding to the processor 1 is 1, while that in the shared register 12 corresponding to the processor 2 is (N/2)+1.

Referring to FIG. 2, the task initiated on the processor 1 compares its start value 1 with end value N/2 with reference to the shared register 11 (S1). As the start value is not greater than the end value (No at S1), the loop is executed at its initial value 1 (S2), and the sum of the start value 1 and an increment is stored into the shared register 11 as a new start value (S3). The control is returned to step S1.

Referring now to FIGS. 1 and 2 together, the task on the processor 1 executes each loop which begins with the start value 1, to which the increment is successively added, by iterating steps S1 to S3. Similarly, the task on the processor 2 also executes each loop which begins with the start value (N/2)+1, to which the increment is successively added, by iterating steps S1 to S3.

If the progress of the task on the processor 1 and that of the task on the processor 2 are equal, the two tasks will complete the loop processing by the initially set number of times at substantially the same time. If, however, the former is ahead of the latter, the task on the processor 1 will complete the loop processing up to the initially set end value N/2 before that of the processor 2.

In this case, the task on the processor 1 decides the relationship between the initial value 1 and the end value N/2 to be $\underline{1} > N/2$ (S1). As the loop processing by the number of times assigned to its own processor 1 has been completed, the shared register 12 corresponding to the other processor 2 is referred to, and the sum of its initial value m (m<N) with the increments is calculated and compared with the end value N set in the shared register 12. If the end value N is found to be greater than the sum of the initial value m and the increments (No at S4), it means that an unprocessed loop or loops are remaining in the task on the other processor 2. As a result, the start and end values in a loop range which is half of the loop range determined by the initial value m and the end value N in the shared register 12 are transferred to the shared register 11 corresponding to the processor 1. In response to this transfer, the start and end values are redefined to be the start and end values in the shared register 12 corresponding to the other processor 2. These processings cause half of the unprocessed loop range (m to N) to be taken over by the processor 1's own task (S5).

If, when the shared register 12 corresponding to the other processor 2 is referred to, the sum of the initial value m and the increments is found to be greater than the end value N (Yes at S4), it means that the task on the other processor 2 has completed the loop processing by the number of times assigned to this processor and there remains no loop processing to take over. As a result, the processing of the processor 1's own task has been completed, too.

While the preferred embodiment described above represents the application of the present invention to a double-processor system comprising two processors, the invention is extensively applicable to multi-processor systems each comprising three or more processors. Where three or more processors are involved, the shared register 12 corresponding to another processor 2 to be referred to when the task operating on a given processor has completed loop processing by the initially set number of times, may be any shared register other than this processor's own, or just as well may be limited to one or more predetermined shared registers.

Next will be described in detail another preferred embodiment of the present invention with reference to FIGS. 3 and 4.

This other preferred embodiment of the invention presupposes a system consisting of I (I≧3) processors.

Figure 3:
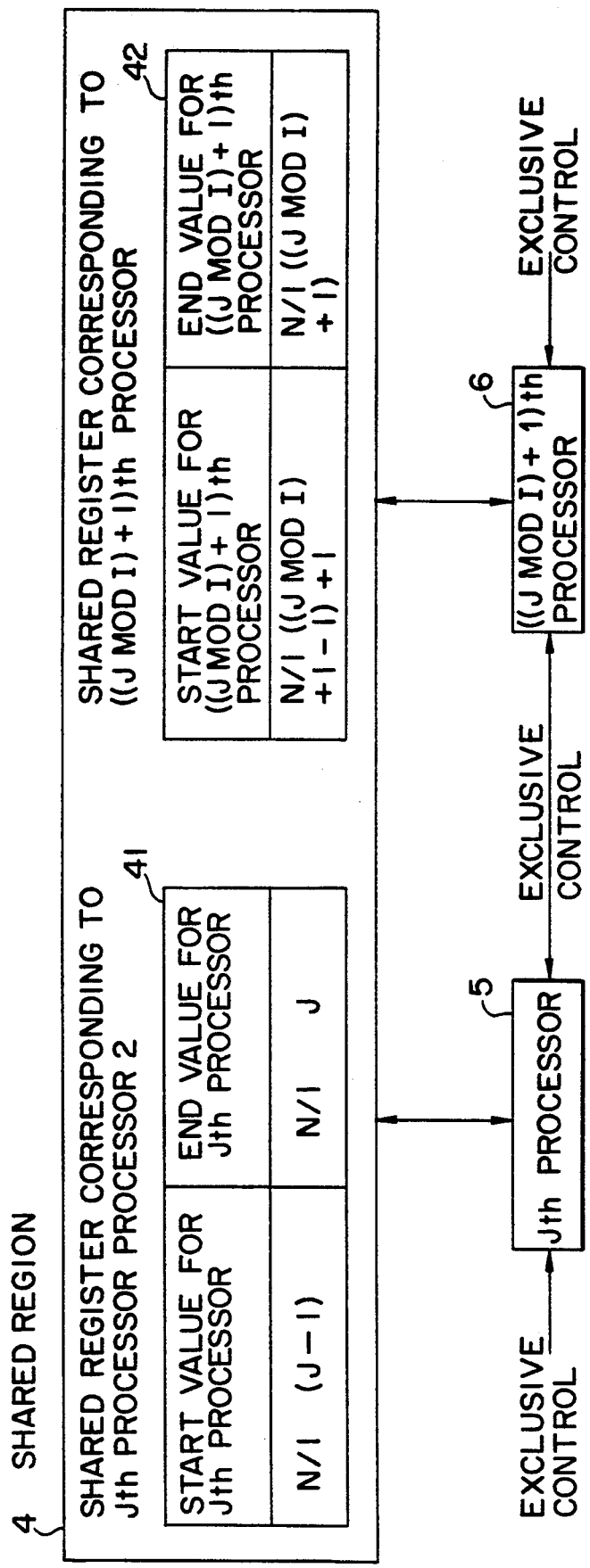
FIG. 3 illustrates a system to which another preferred embodiment of the invention is applied.

Referring to FIG. 3, a system to which the other preferred embodiment of the invention is applied comprises I processors for executing individual tasks including a Jth processor 5 and ((J MODI)+1)th processor 6 and a shared region 4 in a memory unit shared by these I processors. In this shared region 4 are shared registers 41 and 42 exclusively used under exclusive control between the processors the ((J MODI)+1)th processor 6 and the Jth processor 5. The Jth shared register 41 corresponds to the Jth processor 5, and the ((J MODI)+1)th shared register 41, to the ((J MODI)+1)th processor 6. In these shared registers 41 and 42 are set the initial start and end values of individual divided segments N/I * (J−1)+1 to N/I * J and N/I * ((J MODI)+1)−1) +1 to N/I * ((J MODI)+1), into which the range 1 to N that can be taken by the loop variables pertaining to the inner loops to be multitasked is divided by I. The values in the shared register 41 are referred to and updated by the processor 5, and those in the shared register 42, by the processor 6.

Now will be described in detail the other preferred embodiment of the invention, together with the operation of the system illustrated in FIG. 3, with reference to the drawing.

Figure 4:
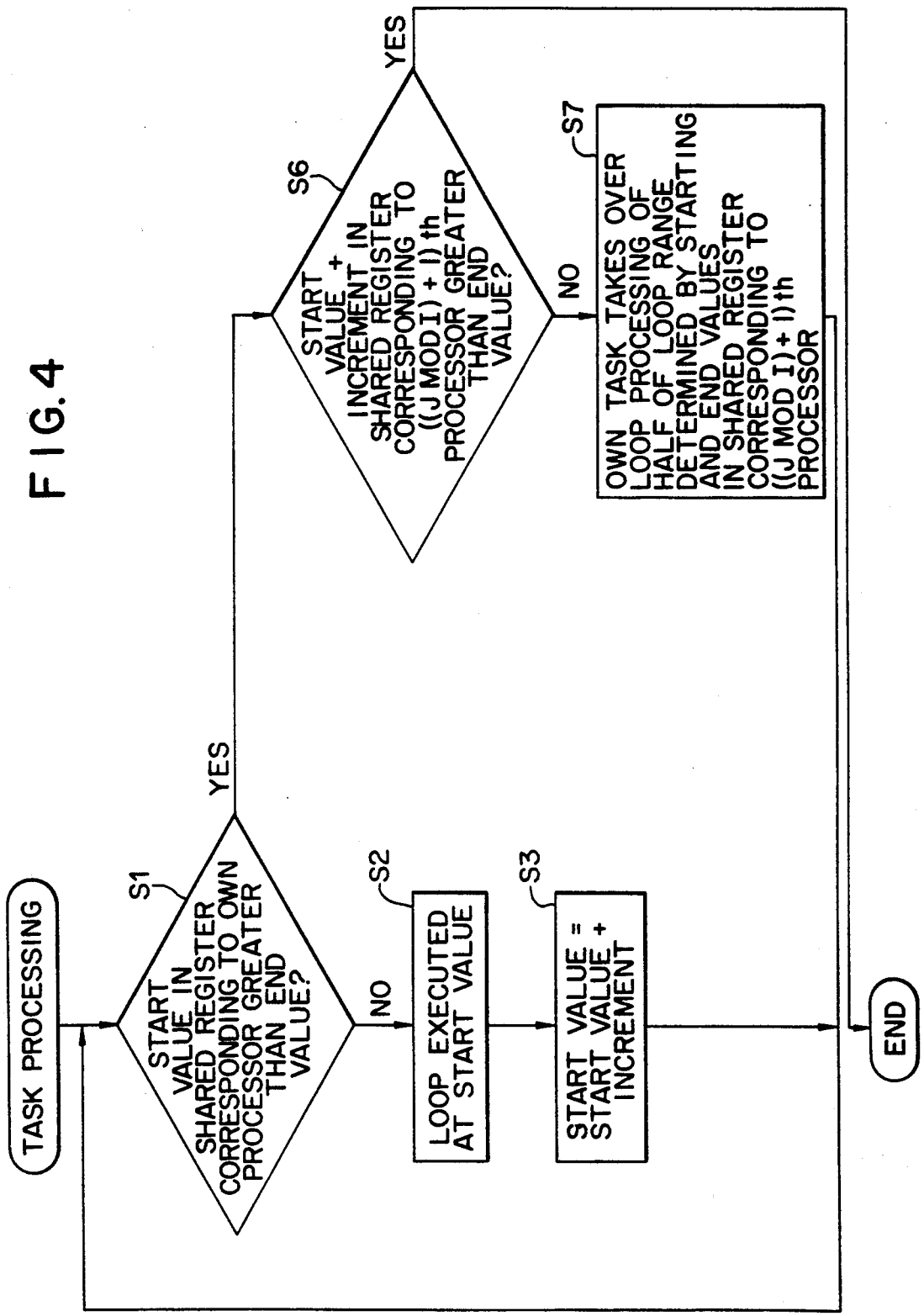
FIG. 4 illustrates characteristic parts of the other preferred embodiment of the invention.

Referring to FIGS. 3 and 4, a master task to process the inner loops to be multitasked sets into the registers is shown in FIG. 3. The initial start and end values of individual divided segments into which the range (1 to N) that can be taken by the loop variables pertaining to each inner loop to be multitasked is divided by I, which is the number of multitasks. At the same time, the master task initiates slave tasks, shown in FIG. 4, in the I processors.

The task initiated on the Jth processor 5 executes its processing as shown in FIG. 4 while updating its content in reference to the shared register 41 corresponding to the processor 5.

At the time of initiating each individual slave task, the start value in the shared register 41 corresponding to the processor 5 is N/I * (J−1)+1.

Referring to FIG. 4, the task initiated on the processor 5 compares its start value N/I * (J−1)+1 and end value N/I * J with reference to the Jth shared register 41 (S1). As the start value is not greater than the end value (No at S1), the loop is executed at its initial value 1 (S2), and the sum of the start value and an increment is stored into the shared register 11 as a new start value (S3). The control is returned to step S1.

Referring now to FIGS. 3 and 4 together, the task on the Jth processor 5 executes each loop which begins with the start value N/I * (J−1)+1, to which the increment is successively added, by iterating steps S1 to S3. Similarly, the task on the ((J MOD I)+1)th processor 6 also executes each loop which begins with the start value N/I * ((J MOD I)+1−1)+1, to which the increment is successively added, by iterating steps S1 to S3.

If the progress of the task on the Jth processor 5 and that of the task on the ((J MOD 1)+1)th processor 6 are equal, the two tasks will complete the loop processing by the initially set number of times at substantially the same time. If, however, the former is ahead of the latter, the task on the Jth processor 5 will complete the loop processing up to the initially set end value N/I * J before that of the ((J MOD 1)+1)th processor 6.

In this case, the task on the Jth processor 5 decides the relationship between the initial value N/I * (J−1)+1 and the end value N/I * J to be N/I * (J−1)+1>N/I * J. As the loop processing by the number of times assigned to its own Jth processor 5 has been completed, the shared register 42 corresponding to the other ((J MOD I)+1)th processor 6 is referred to, and the sum of its initial value m [m<N/I * ((J MOD I)+1)] and the increments is calculated and compared with the end value N/I * ((J MOD I)+1) set in the shared register 42. If the end value N/I ((J MOD I)+1) is found greater than the sum of the initial value m and the increments (No at S6), it means that an unprocessed loop or loops are remaining in the task on the ((J MOD I)+1)th processor 6. As a result, the start and end values in a loop range half the loop range determined by the initial value m and the end value N/I * ((J MOD I)+1) are transferred to the shared register 41 corresponding to the Jth processor 5, and in response to this transfer are redefined the start and end values in the shared register 42 corresponding to the ((J MOD I)+1)th processor 6. These processings cause half of the unprocessed loop range [m to N/I * ((J MOD I)+1)] to be taken over by the Jth processor 5's own task (S7).

If, when the shared register 42 corresponding to the ((J MOD I)+1)th processor 6 is referred to, the sum of the initial value m and the increments is found greater than the end value N/I * (J MOD I)+1 (Yes at S6), it means that the task on the ((J MOD I)+1)th processor 6 has completed the loop processing by the number of times assigned to this processor and there remains no loop processing to take over. As a result, the processing of the Jth processor 5's own task has been completed, too.

A first feature of the present invention consists in that, where inner loops are to be multitasked, the range which can be taken by loop variables are divided so that the divided segments can be assigned to registers, shared among more than one processor. This enables execution on a processor-by-process basis, and reference to shared registers corresponding to other processors, among other things, is accomplished after loop processing by the number of times assigned to the particular register has been completed. This first feature of the invention provides the benefit of minimizing the possibility of contention arising for reference to shared registers.

A second feature of the invention consists in that, where the shared register corresponding to another processor is referred to after the completion of loop processing by the number of times assigned to the task on a first register and any unprocessed loop or loops are found remaining in the task on the other processor, a part of the range which can be taken by loop variables pertaining to the unprocessed loop or loops is transferred to the shared register corresponding to the first register for loop processing by the task on this register.

The first and second features of the invention together provide the benefit of reducing the total execution time taken by the inner loops.

The greater the number of processors and the number of times loops are executed, the greater this benefit.

What is claimed is:

1. An apparatus for reducing contention to shared registers in multitasking program loops, said apparatus comprising:

a plurality of individual processors for executing segments of each program loop;

a plurality of shared registers each corresponding to one of said plurality of individual processors, wherein each of said plurality of shared registers store start and end values, each of said start and end values representing different segments of a range of loop variables pertaining to said program loops;

each of said plurality of individual processors including executing means connected to said corresponding shared register for executing a program loop pertaining to said start value within said corresponding shared register and for incrementing to a next value of said loop variables and for executing a program loop pertaining to said next value and for iteratively continuing through said segment of loop variables until said end value stored in said corresponding shared register is executed;

decision means, operative after said end value is reached, for referring to a shared register corresponding to a different individual processor, and for deciding whether or not there remain any unprocessed loops to be processed by said different individual processor; and continuing means responsive to a decision by said decision means that said different individual processor has unprocessed loops remaining, for processing a plurality unprocessed loops by transferring to its corresponding shared register a new start and end value corresponding to said plurality of said unprocessed loops and by indicating a new start and end value in said shared register corresponding to said different individual processor corresponding to a part of said unprocessed loops not transferred thereby reducing contention to said shared register corresponding to said different individual processor.

2. A method for reducing contention to shared registers when multitasking program loops, wherein each segment of said program loops is executed by one of a plurality of individual processors comprising a multi-processor system, said multi-processor system being provided with a plurality of shared registers, each of said plurality of shared registers corresponding to one of said plurality of individual processors, said plurality of shared registers storing start values and end value defining segments of a range of loop variables pertaining to said program loops, said method comprising the steps of:

executing iteratively, in a first processor, each of said loop variables represented in a first segment corresponding to said first processor, starting with said start value and incrementing an executed value at each execution until said end value stored in said shared register corresponding to said first processor is executed;

referring to one of said plurality of shared registers corresponding to a different processor after completion of said executing step and determining whether there remain any unprocessed loops in said different processor;

transferring a plurality of loop variables in said shared register corresponding to said different processor to said shared register corresponding to said first processor, said plurality of loop variables pertaining to a part of said unprocessed loops, to form new start and end values in said shared register corresponding to said first processor and to form new start and end values in said shared register corresponding to said different processor, thereby reducing contention to said shared register corresponding to said different processor; and continuing processing of said unprocessed loops in said first and said different processors according to said new start and end values in said corresponding shared registers.

3. A system for reducing contention to shared registers in multitasking program loops in a multi-processor system including a plurality of individual processors, each segment of said program loops in said system being executed by one of said plurality of individual processors, said multi-processor system being provided with a plurality of shared registers each corresponding to one of said plurality of individual processors, said plurality of shared registers storing a plurality of corresponding start and end values defining segment ranges, said segment ranges being segments into which an overall range of loop variables corresponding to said program loops are divided, each of said plurality of individual processors comprises:

executing means for processing a first segment range corresponding to a first individual processor for each value in said first segment range defined by said start and end values corresponding to said fist individual processor and for indicating when all values in said first segment range have been executed;

determining means operative when said execution means indicates all of said values in said first segment range are executed, for determining whether or not there remain any unprocessed loops in a second segment range corresponding to a second individual processor by referring to a shared register corresponding to said second individual processor, said unprocessed loops forming an unprocessed segment range;

means for transferring a plurality of loop variables in said unprocessed segment range to said shared register corresponding to said first individual processor;

means for generating a new first segment range corresponding to said first individual processor and a new second segment range corresponding to said second individual processor, thereby reducing contention to said shared register corresponding to said second individual processor; and continuing means for processing said transferred plurality of loop variables, defined by said new first segment range in said first processor.

4. A method as recited in claim 2, wherein said determining step further comprises comparing a next value to be executed by said different individual processor at the time of said comparison with said end value in said shared register corresponding to said different individual processor to determine whether said unprocessed loops remain.

5. The system as recited in claim 3, wherein said determining means further comprises comparing means for comparing a next value to be executed by said second individual processor with said end value of said second segment range in said shared register corresponding to said second individual processor.

6. An apparatus as recited in claim 1, wherein which one of said plurality of individual processors is referred to as said different individual processor is predetermined.

7. An method as recited in claim 2, said method further comprising the step of predetermining which of one said plurality of individual processors will be referred to by said referring step.

8. An system as recited in claim 3, wherein which one of said plurality of individual processors is said second individual processor is predetermined.

9. An apparatus as recited in claim 1, wherein said continuing means transfers from said different individual processor one half of said unprocessed loops remaining as said plurality of said unprocessed loops.

10. A method as recited in claim 2, wherein said transferring step further comprises the step of transferring one half of said unprocessed loops to said first processor such that said first processor executes one half of said unprocessed loops and said different processor executes another half of said unprocessed loops.

* * * * *